United States Patent [19]

Smetanick

[11] 4,346,905
[45] Aug. 31, 1982

[54] TANK TRAILER

[75] Inventor: Andrew Smetanick, Freeport, Pa.

[73] Assignee: Freeport Transport, Inc., Freeport, Pa.

[21] Appl. No.: 62,050

[22] Filed: Jul. 30, 1979

[51] Int. Cl.³ .............................................. B62D 53/06
[52] U.S. Cl. ..................................... 280/5 C; 105/248; 298/27
[58] Field of Search ..................... 298/1 R, 24, 25, 26, 298/27, 28, 29, 30, 31, 32, 33, 34, 35 R, 35 M, 36, 37; 280/5 C, 5 E, 5 D, 5 G, 5 R; 414/378, 379, 380; 406/184, 185; 105/247, 248, 249, 250, 251, 252, 253, 254, 255, 256, 257, 358, 359, 360, 361; 296/15, 181, 184, 183, 182

[56] References Cited

U.S. PATENT DOCUMENTS

| 1,373,434 | 4/1921 | Kramer | 280/5 D |
| 2,036,607 | 4/1936 | Robinson | 280/5 C |
| 2,299,702 | 10/1942 | Mosel | 298/31 X |
| 2,413,488 | 12/1946 | Draeger | 280/5 F X |
| 3,419,310 | 12/1968 | Gramlich | 298/27 X |
| 3,583,330 | 6/1971 | Freudman et al. | 105/360 X |
| 4,230,048 | 10/1980 | Gordon et al. | 105/358 X |

FOREIGN PATENT DOCUMENTS

| 256638 | 8/1967 | Austria | 280/5 C |
| 1928336 | 12/1970 | Fed. Rep. of Germany | 280/5 C |
| 1515644 | 6/1978 | United Kingdom | 280/5 R |

Primary Examiner—Frank E. Werner
Attorney, Agent, or Firm—Edmund M. Jaskiewicz

[57] ABSTRACT

A tank trailer for transporting dry and liquid flowable materials comprising a horizontally disposed substantially cylindrical tank having front and rear transverse end walls. On each end wall is a hopper structure inclining upwardly and outwardly from the bottom portion of each end wall and having a width considerably less than the diameter of the tank. Extending horizontally from the bottom portions of the respective end walls are front and rear platforms. These platforms each have a width approximately equal to the diameter of the tank and are adapted to carry freight thereon in the manner of a flatbed trailer.

6 Claims, 6 Drawing Figures

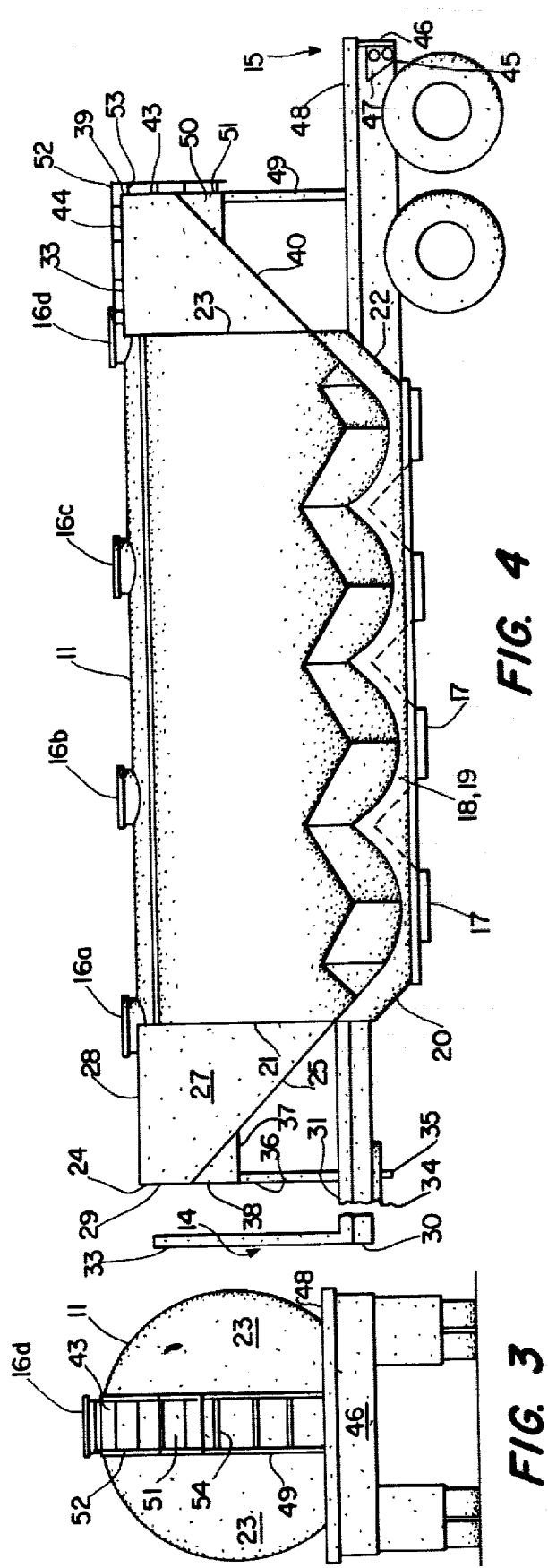
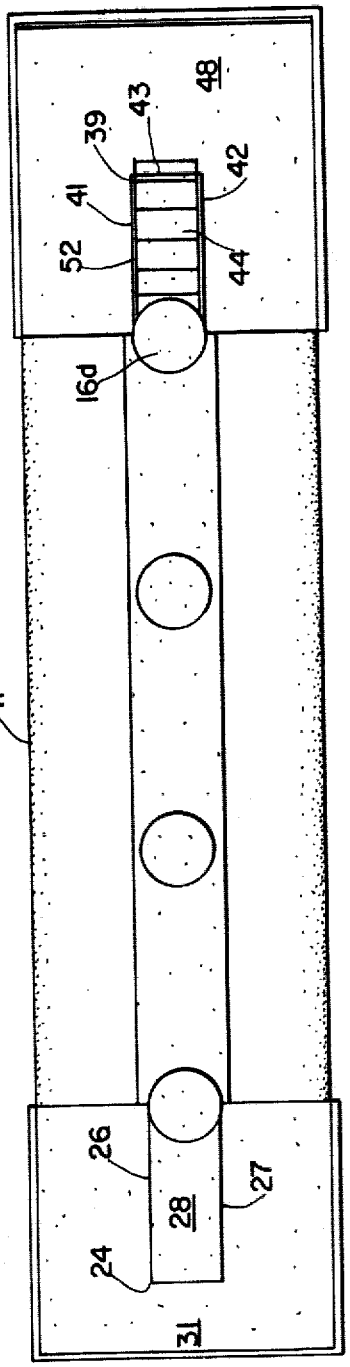
FIG. 4
FIG. 3
FIG. 5

TANK TRAILER

FIELD OF THE INVENTION

The present invention relates to a tank trailer for transporting dry and liquid flowable materials, more particularly, to such a trailer having flatbed portions thereon upon which freight may be loaded.

PRIOR ART

Many forms of tank trailers have been devised for transporting flowable materials including liquids and a wide variety of pulverulent and granular solid materials. One such tank trailer has a horizontally disposed substantially cylindrical tank with upwardly inclined ends and a plurality of hoppers formed in the bottom of the tank to facilitate the unloading of the tank. The tank is provided on its top with a number of filler openings for loading of the tank. The tank may also be divided into a number of compartments so that each compartment can be loaded and unloaded separately and independently of the other compartments. The inclined or sloping end structure of the tanks facilitates the downward flow of dry and liquid flowable materials when these materials are being unloaded through the hopper bottoms. A suitable frame structure is then attached to each end of the tank at the lower portion thereof so that one frame structure serves as a supporting carriage for wheels and the other frame structure is provided with a trailer hitch for connecting the trailer to a tractor.

Such a tank trailer provides an effective structure for the transporting of dry and liquid flowable materials. However, such tank trailers have no facilities for carrying other types of freight and goods, such as might be in crates or stacked on pallets. Under many circumstances and particularly with respect to building construction it would be desirable to provide a trailer structure which could haul both dry material in the form of cement and also have some provision for hauling containers of building supplies and the like in the manner of a flatbed trailer. Since tank trailers up to the present date are limited to the hauling of only dry or liquid flowable materials such a trailer must either return empty after it has discharged its load of dry or liquid flowable materials or a separate flatbed trailer must be provided to haul other kinds of freight such as might be stacked on pallets or skids or packed in containers.

Since tank trailers are primarily intended to transport dry or liquid flowable materials, it is desireable that the capacity of such tank trailers should be unchanged or at the most insignificantly decreased in order to provide a capacity for handling of other types of freight on the same trailer. Since the tanks for such tank trailers have highly sophisticated design and construction to facilitate the loading and unloading of liquid or dry flowable materials, it would not at all be feasible to mount a tank of substantially decreased capacity upon a flatbed trailer in order to adapt the trailer to handle both flowable and packaged materials.

It is therefore the principal object of the present invention to provide a novel and improved tank trailer.

It is another object of the present invention to provide a tank trailer which can also transport containers or stacked freight in addition to dry and liquid flowable materials.

It is a further object of the present invention to provide a process for the adapting of a dry bulk tank trailer having inclined ends and a hopper bottom so as to accommodate containers or stacked freight goods.

SUMMARY OF THE INVENTION

According to one aspect of the present invention a tank trailer for transporting dry and liquid flowable materials comprises a horizontally disposed substantially cylindrical tank having front and rear transverse end walls. Each of the end walls is provided with a hopper structure which inclines upwardly and outwardly from the bottom portion of the end wall and the hopper structure has a width less than one third of the diameter of the tank. Front and rear platforms which are adapted to carry freight thereon extend horizontally away from the bottom portions of the respective end walls and each platform has a width approximately equal to the diameter of the tank. Vertical support means are provided between each of the platforms and the upper ends of the respective hopper structures.

A substantially cylindrical tank for a tank trailer having downwardly inclined ends and a hopper structure is modified by replacing the inclined end walls with transverse end walls and forming a hopper structure on each transverse end wall. The hopper structure has a width less than one third of the diameter of the tank and is provided with a bottom wall inclining upwardly and outwardly from the bottom portion of the end wall and substantially vertical side walls.

DESCRIPTION OF THE DRAWINGS

Other objects and advantages of the present invention will be apparent upon reference to the accompanying description when taken in conjunction with the following drawings, which are exemplary, wherein;

FIG. 3 is an end elevational view of the tank trailer of FIG. 1;

FIG. 4 is a side elevational view of the tank trailer of FIG. 1;

FIG. 5 is a top plan view of the tank trailer of FIG. 1; and

DETAILED DESCRIPTION OF THE INVENTION

Proceeding next to the drawings wherein like reference symbols indicate the same parts throughout the various views a specific embodiment and modifications of the present invention will be described in detail.

Figure 1:
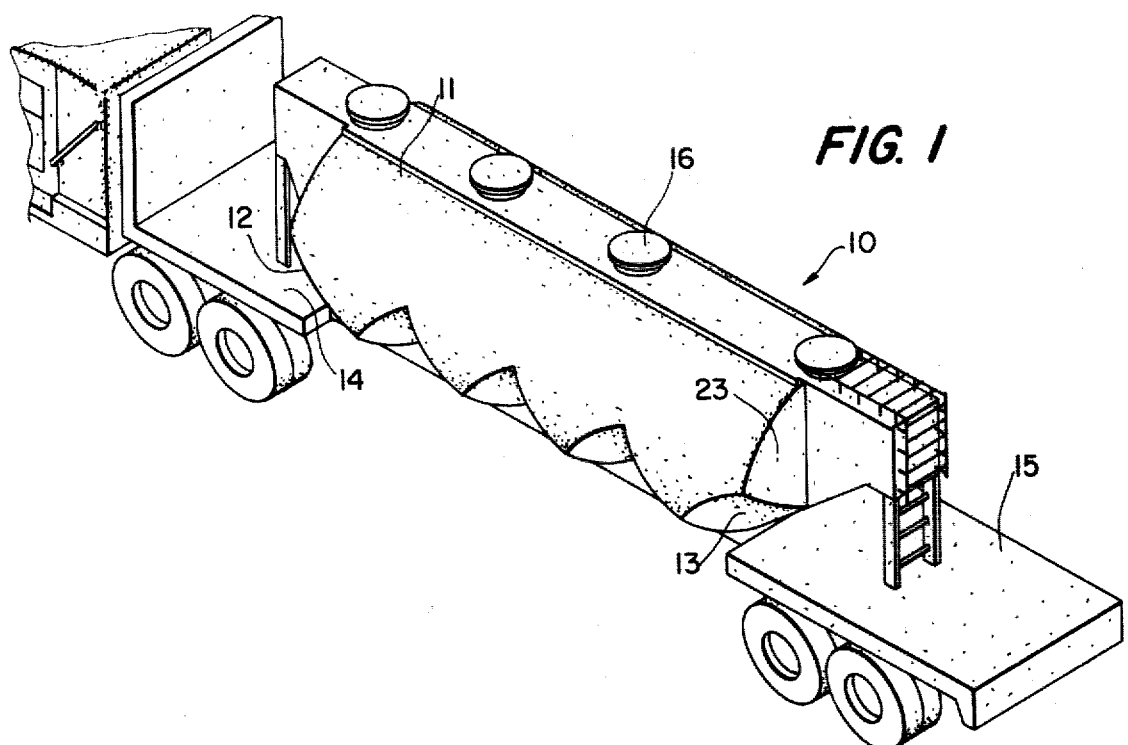
FIG. 1 is an overall perspective view from the rear of the tank trailer according to the present invention.

Illustrated in FIG. 1, is a tank trailer indicated generally at 10 according to the present invention for transporting dry and liquid flowable materials and comprising a tank 11 which is substantially horizontally disposed and having a front end 12 and a rear end 13. The bottom portions of both ends are inclined upwardly. The tank 11 receives and encloses the material to be transported and is mounted upon a front undercarriage assembly 14 and a rear undercarriage assembly 15 for supporting the trailing end of the tank 11 on appropriate running gear.

The tank 11 is divided by vertical partition walls into a plurality of compartments each of which is provided with its own opening closed by hatch cover 16. The tank 11 may also be constructed without any partitions so as to form a single enclosure provided with a plurality of openings each with a hatch cover to expedite the filling of the tank with material.

The bottom of the tank is provided with a plurality of hopper openings 17 each of which can be opened or closed through which the material within the tank can be discharged as known in the art.

As further known in the art and as may be seen in FIG. 1, the bottom of the tank is built with a plurality of sloping or inclined surfaces which converge toward the openings 17 so as to facilitate the discharge of material from the tank through the hopper openings, either selectively or collectively.

The tank 11 is supported upon a pair of spaced longitudinal frame elements 18 and 19 which are disposed laterally on both sides of the hopper openings 17. The front ends of the frame elements 18 and 19 bend upwardly as indicated at 20 and terminate at a point so as to be substantially flush with a transverse front end wall 21 of the tank trailer.

In a similar manner, the rear ends of the frame members 18 and 19 bend upwardly at 22 to terminate at a point so as to be flush with a transverse rear end wall 23 of the tank trailer.

The front end wall 21 is transverse to the longitudinal axis of the tank 11 and extends downwardly to the bottom portion of the tank to intersect the upwardly sloping front end 12 of the tank.

Extending outwardly from the central vertical portion of the end wall 21 there is a hopper 24 having a bottom wall 25 which inclines upwardly as a continuation of the sloping portion of the front end wall 12. The hopper also comprises substantially parallel side walls 26 and 27, a top wall 28 and an end wall 29. As can be seen in FIG. 5 of the drawings, the side walls 26 and 27 are vertical with respect to the horizontally disposed tank 11 and substantially parallel to each other. The hopper 24 has a width which is less than one third of the diameter of the tank 11 and in this particular embodiment has a width which is about 22% of the tank diameter.

The tank end wall 21 is provided with a vertical opening to which the hopper 24 is fitted so that the hopper communicates into the interior of the tank 11 and can be employed for filling the tank through the opening 16a which in this particular embodiment is located to extend over both a portion of the tank and a portion of the hopper 24.

The front undercarriage 14 comprises a pair of longitudinally extending frame members 30 whose inner ends are connected to the upwardly curved portions 20 of the tank frame members at a point positioned above the bottom of the frame members, as shown in FIG. 4. Upon the frame members 30 there is mounted a platform 31 whose width extends over the diameter of the tank 11 as can be seen in FIG. 5 and extends forwardly of the front end of the hopper 24 as may be seen in FIG. 4. The platform 31 may comprise a plurality of transverse frame members extending laterally from the longitudinal frame members 30 and covered with a suitable surface, such as wood or metal. The platform 31 thus forms a flatbed of substantial area upon which pallets of bricks or other building material and containers of freight can be easily loaded. Upstanding from forward edge 32 of platform 31 is a vertical wall or panel 33 which supports and positions a load on the platform 31. As can be seen in FIG. 5, the hopper 24 occupies only a relatively small portion of the area of the platform 31 so that the remaining open area of platform 31 is available for the loading of freight which can be stacked to a height substantially equal to the top of tank 11.

Mounted on the underside of the frame elements 30 is a plate structure 34 upon which is secured a hitch element 35 for being engaged by an appropriate structure on a tractor. The front undercarriage structure 14 can be provided with any well-known hitch structure for permitting the tank trailer to be pulled by a tractor. The front undercarriage can also be provided with suitable structure for receiving running gear, if so desired.

Extending upwardly from the frame elements 30 and through the platform 31 is a pair of vertical upright members 36 which connect to the upper end of the hopper structure 24 in order to provide vertical support to the hopper structure. The uprights 36 may comprise hollow metal members, such aluminum, having a substantially rectangular cross-section.

Triangular skirt members or gusset plates 37 are attached near the upper end of the bottom wall 25 and enclose the upper ends of the uprights 36. An end plate 38 is fastened across the upper ends of the uprights 36 and immediately below upper end wall 29 so as to form a contination of the upper end wall.

In a similar manner, a rear hopper 39 is constructed on the central vertical portion of the rear transverse end wall 23 and similarly provided with an inclined bottom wall 40, side walls 41 and 42, an end wall 43 and a top wall 44. An inlet opening with a cover 16d is also positioned to include portions of the tank 11 and rear hopper 39.

Extending rearwardly from the rear end portions 22 of the frame elements is a pair of undercarriage frame elements 45 whose inner ends are connected at substantially the bottom of the tank, as shown in FIG. 4. The ends of the frame elements 45 are protected by a relatively heavy structural plate 46 which functions as a bumper and is welded or otherwise secured to the frame elements 45 by angle connecting plates 47.

A rear platform 48 is mounted on the upper surface of the frame elements 45 and may be supported upon laterally extending frame members in a manner similar to that of the front platform 31. The rear platform 48 extends rearwardly outwardly of the end of the rear hopper 39 but a distance which is substantially equal to the distance of the platform under the hopper, as also may be seen in FIG. 4. The length of this platform may vary depending on the size and shape of the tank and the nature of the frame supporting structure of the tank. A pair of vertical uprights 49 extend upwardly from the frame members 45 to connect the upper end of the hopper 39 and to support vertically the hopper. Triangular skirt members 50 enclose the upper ends of the uprights 49 and an end plate 51 is positioned across the upper ends of the uprights 49 and immediately below upper end wall 43 as may be seen in FIG. 3.

Mounted on the underside of the rear carriage 15 is suitable running gear which in this embodiment comprises a pair of axles having on each end thereof a double wheel.

The tank is constructed of stainless steel, sheet aluminum or aluminum alloy of a suitable gauge sufficiently heavy for the intended use of the tank and all other structural elements of the tank trailer are similarly constructed of suitable stainless steel, aluminum or aluminum alloy elements.

The front and rear platforms 31 and 48 may also be constructed of a plurality of transverse support frame elements which extend across the entire width of the respective platforms and are attached upon the upper edges of the respective frame elements 30 and 45.

A pair of hand rails 52 attached to the ends of short supporting arms 52 can be mounted on the top walls of one or both of the hoppers. Preferably, the hand rails extend downwardly along the ends of the hoppers as shown or may even be extended along the lengths of the respective vertical uprights 36 and 49.

Steps or rungs 54 are provided between the uprights 49 and between hand rails 52 to permit access to the top of the tank 11.

Figure 2:
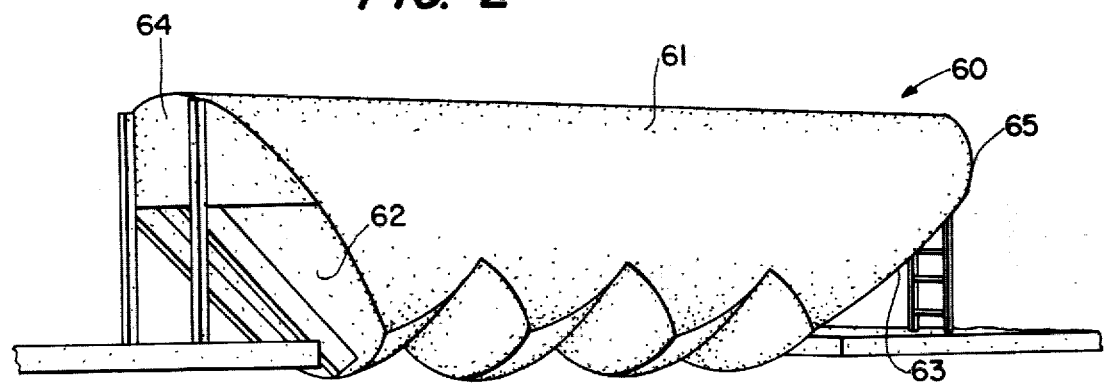
FIG. 2 is a perspective view looking from the front of a cylindrical tank for a tank trailer from which the tank trailer of the present invention is constructed.
Figure 6:
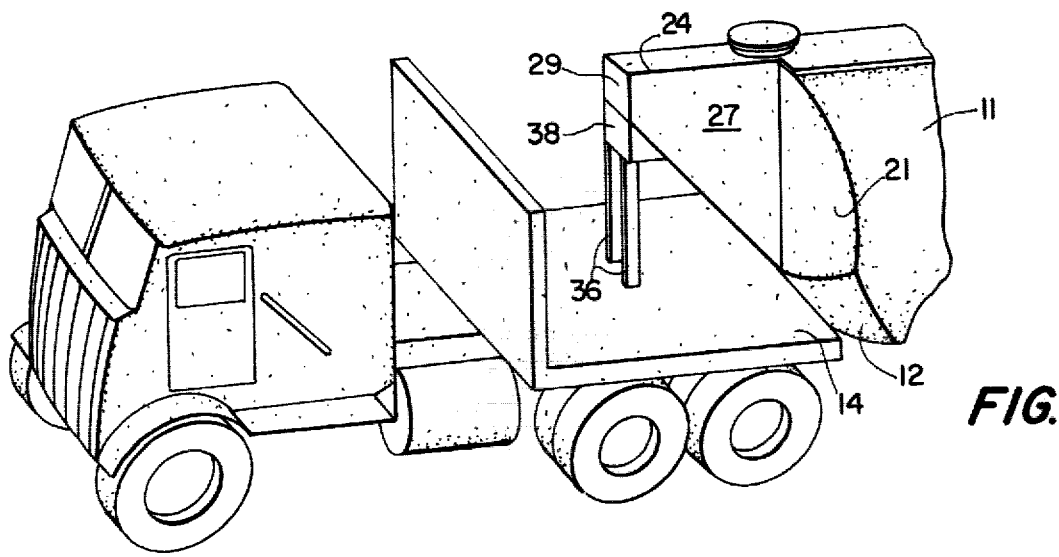
FIG. 6 is a perspective view of the front end portion of the tank trailer of FIG. 1 looking from above.

The tank trailer of the present invention can also be constructed by modifying an existing tank trailer 60 having a substantially cylindrical tank 61 with downwardly inclined ends 62 and 63 and a hopper bottom, such as shown in FIG. 2. Curved end walls 64 and 65 enclose the upper ends of inclined end walls 62 and 63.

To modify such an existing tank, the curved end walls and major portions of the upper portions of both of the inclined end walls are removed and then replaced with the transverse end walls 21 and 23. The hopper structure is formed on each transverse end wall. A portion of the top surface of the tank 61 can be used as the top wall of the hopper.

The existing frame elements for the front and rear undercarriages of the tank trailer can also be used but platforms are constructed upon these elements. The elements of the undercarriage structures are attached to the frame elements in a manner similar to the existing tank trailer, but the upper portions of the frame elements terminate at the connection with the undercarriage frame elements.

The ends 62 and 63 may be inclined at different angles, depending on the intended use of the tank. These angles may range from 45°-55°. The process of modifying the tank 61 remains the same for these differing angles of inclination.

By replacing the inclined end walls of the existing tank trailer with the transverse end walls of the present invention, the capacity of the tank is decreased only a small amount but a substantial flat area and vertical zone on both platforms is now available for the loading of freight or packaged cargo. Thus, the tank trailer of the present invention functions both to haul contents in its tank the capacity of which has been only slightly decreased and also performs the function of a flatbed trailer.

It will be understood that this invention is susceptible to modification in order to adapt it to different usages and conditions, and accordingly, it is desired to comprehend such modifications within this invention as may fall within the scope of the appended claims.

What is claimed is:

1. A tank trailer for transporting dry and liquid flowable materials comprising a horizontally disposed substantially cylindrical tank having front and rear transverse end walls, said tank supported upon a longitudinal frame element structure along its bottom portion and said frame structure having upwardly inclined ends terminating at the end walls of said tank, a hopper structure on each of said tank end walls and inclining upwardly and outwardly from the bottom portion of said end wall, said hopper structure having a width less than one third of the diameter of said tank, front and rear platforms adapted to carry goods thereon connected to and extending horizontally away from the ends of said frame structure at the bottom portions of the respective end walls and each platform having a width approximately equal to the diameter of the tank, said tank, frame structure and platforms defining a single structural unit, said hoppers each projecting over a portion of a respective platform, and vertical support means between each of said platforms and the upper end of the respective hopper structure.

2. A tank trailer as claimed in claim 1 wherein each of said hopper structures has a bottom wall inclining upwardly and outwardly from the bottom portion of its end wall and has vertical side walls spaced apart the width of the hopper structure.

3. A tank trailer as claimed in claim 2 wherein said hopper structure has a substantially horizontal top wall.

4. A tank trailer as claimed in claim 3 and comprising a filler opening on the top of the tank at the junction of the top wall of the hopper structure and the tank.

5. A tank trailer as claimed in claim 1 wherein said hopper structure is along the central vertical portion of a said end wall.

6. A tank trailer as claimed in claim 1 wherein said vertical support means comprises a pair of vertical upright members under each hopper and spaced apart a distance approximately equal to the width of the hopper.

* * * * *